Jan. 28, 1964   F. HISCOCK   3,119,269
RECORDING THERMOMETER
Filed April 5, 1962   2 Sheets-Sheet 1
FIG. I
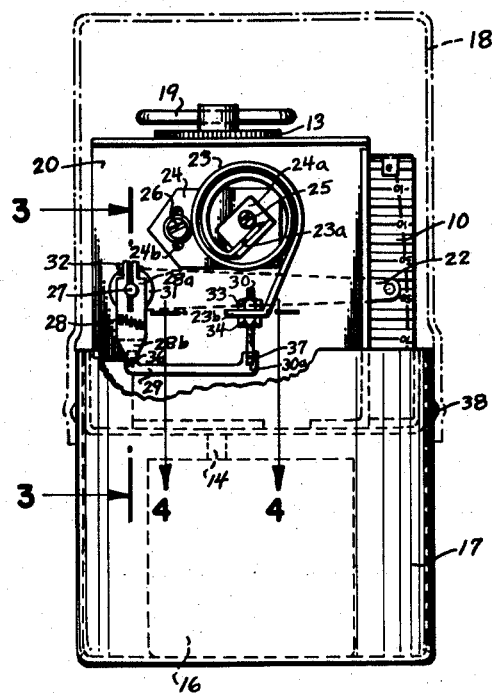
FIG. 2
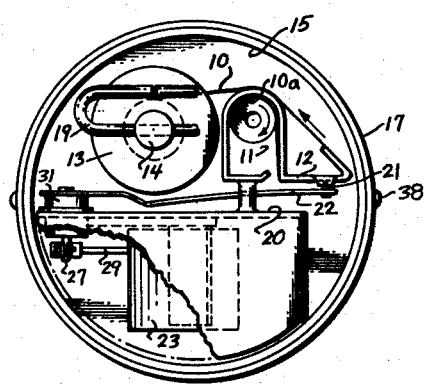
INVENTOR.
FRANK HISCOCK
BY Barnes + Seed
ATTORNEYS Jan. 28, 1964 F. HISCOCK 3,119,269
RECORDING THERMOMETER
Filed April 5, 1962 2 Sheets-Sheet 2

INVENTOR.
FRANK HISCOCK
BY Barnes + Seed
ATTORNEYS

United States Patent Office 3,119,269
Patented Jan. 28, 1964

3,119,269
RECORDING THERMOMETER
Frank Hiscock, Seattle, Wash., assignor to Ryan Recording Thermometer Co., Seattle, Wash., a corporation of Washington
Filed Apr. 5, 1962, Ser. No. 185,444
8 Claims. (Cl. 73—343.5)

The present invention relates to improvements in recording thermometers for installation in refrigerated compartments, particularly on trains, trucks, planes and ships, to provide an accurate and continuous in transit record of the temperature at which the compartment is maintained. This monitoring is especially important during the transportation of those comestibles whose temperature must be kept below an upper limit above which the products are subject to deterioration and spoilage.

Various objects of the invention are to provide an accurate and sensitive recording thermometer which is compact, portable, sealable, rugged, simple and economical in construction, and easily set and mounted, and yet is capable of accurate and minute calibral adjustment.

The above and other objects and advantages in view will appear and be understood in the course of the following description and claims, the invention consisting in the novel construction and in the adaptation and combination of parts hereinafter described and claimed.

In the accompanying drawing:

FIGURE 1 is a front elevational view of a recording thermometer embodying the present invention with part of the case broken away and the cover in phantom, and with the stylus and related apparatus shown in mid-range position.

FIG. 2 is a top plan view of the thermometer with the cover removed.

Figure 3:
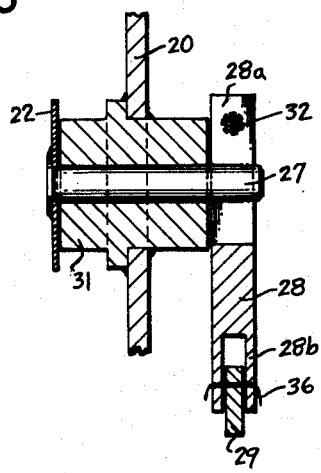
Figure 4:
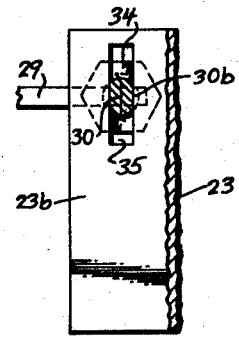

FIGS. 3 and 4 are detail sectional views taken along the line 3—3 and 4—4, respectively of FIG. 1.

Figure 5:
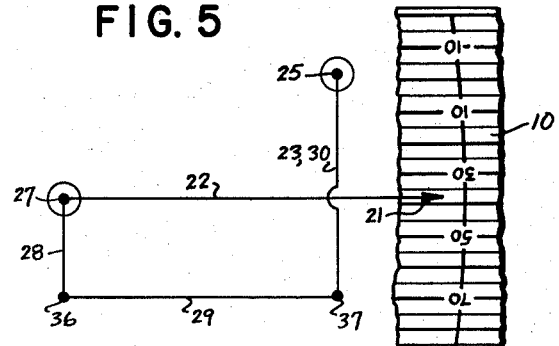
Figure 6:
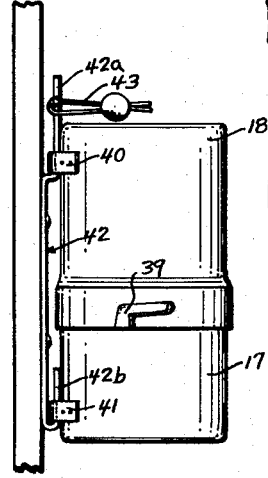

FIG. 5 is a schematic of the stylus and thermostatic coil with their interconnecting linkage; and FIG. 6 is a side elevational view of the device in mounted position.

Referring to the drawings it is seen that an upright record sheet or chart 10 is stored as a roll 10a in a wall 11 and is fed over a recording table 12 from which it doubles back behind the table and well to a spool 13. The spindle 14 of the spool depends through the base of a mounting cup 15 to a clockwork mechanism 16 in turn mounted in a foot case 17 in which the mounting cup is seated and over which a removable cover 18 is applied. This clockwork 16 functions to rotate the spool at a given rate correlated with the time scale on the chart 10. The spindle 14 has a key handle 19 at the top for winding the clockwork mechanism.

It will be noted that the well 11 and table 12 are fabricated from a single piece of sheet metal which is mounted in spaced relation to a support wall 20 having foot flanges anchored to the base of cup 15. The chart 10 is continuously contacted by a stylus 21 as it passes over the table 12 to present a record line, the stylus being carried at the free end of a pivoted spring arm 22 located between the wall 20 and the chart. This arm urges the stylus toward the table 12 and causes it to swing in a vertical arc responsive to temperature changes to which a thermostatic element 23 interconnected with the arm is sensitive.

The thermostatic element 23 comprises a bimetallic coil of the type which expands responsive to temperature increases. At its inner end this coil has a flat terminal 23a which is welded to an angle piece 24a on an adjusting plate 24 and at its outer end it is formed with a flat terminal 23b whose plane is tangential to a radius of the coil. During expansion and contraction of the thermostatic coil its outer terminal 23b moves clockwise and counterclockwise, respectively, with respect to an anchor screw 25 which passes through the plate 24 at the center of the coil and is threaded into the wall 20. A second anchor screw 26 for the plate 24, also having an adjustment function is threaded into this wall 20 and passes through an arcuate adjusting slot 24b having the screw 25 as its center.

Interconnecting the stylus arm 22 and the thermostatic coil 23 there is provided a rocker shaft 27, crank 28, link 29, and adjusting pin 30. The rocker shaft is fixed at its rear end to the stylus arm and extends forwardly through a journal 31 on the wall 20 and into a bifurcated clamphead 28a presented at the upper end of the crank 28. A set screw 32 is threaded through the bifurcations of the crank for locking the stylus relative to the crank. At its lower end the crank 28 is formed with a clevis 28b which pivotally receives the related end of the link 29. Similarly, the adjusting pin 30 has a clevis head 30a at its lower end pivotally receiving the other end of the link 29. Fine pieces of wire 36—37 bent over at their ends serve as the pivot pins for connecting the ends of the link 29 to the clevises 28b and 30a, respectively. The adjusting pin 30 is formed with diametrically opposite flats 30b along its length and has its shank threaded between these flats to receive a pair of lock nuts 33—34 for bearing against the opposite sides of the outer coil terminal 23b. A rectangular slot 35 is formed in this terminal to receive the pin 30 and the longitudinal sides of this slot coact with the pin flats 30b to prevent turning of the pin relative to the coil 23. With this arrangement the distance from the pivot pin 37 at the head of the adjusting pin 30 to the anchoring screw 25 at the center of the coil can be readily adjusted merely by loosening one of the lock nuts 33—34 and tightening up the other.

As indicated schematically in FIG. 5, an understanding of the present invention is aided by considering the coil 23 and the adjusting pin 30 as together comprising a link 23, 30 pivoted at its upper end on the anchor screw 25 and at its lower end on the pivot pin 37, and by further considering that this link 23, 30 turns clockwise responsive to temperature increases and counterclockwise as a result of temperature drops. This link 23, 30 will of course not remain absolutely constant in length during the full temperature range of the instrument, but the change in length is so small that its effect may be neglected over a temperature range of at least 100° F. It is in this light that the schematic of FIG. 5 has been made. Of importance is to understand that the link 23, 30 is purposely considerably longer than the effective length of the crank 28 (distance between the axes of the rocker shaft 27 and the pivot pin 36) so that the angular deflection of the outer end of the thermostatic coil 23 will be multiplied at the stylus 21, this multiplication being the ratio of the length of the link 23, 30 to the effective length of the crank. Thus when this ratio is increased by increasing the radial projection of the adjusting pin 30 from the coil 23, the angular displacement of the stylus for a given temperature increment is increased accordingly.

It will be noted that on the chart 10 the abscissas represent temperature intervals and that the ordinates are arcuate in correspondence with the swing arc of the stylus 21 and represent time intervals correlated with the clockwork mechanism and diameter of the spool. Also, it will be noted that the chart is upside down in the sense that the lower temperatures are at the top of the chart and the higher temperatures are at the bottom.

Ideally, the instrument should be initially calibrated in a temperature environment corresponding to the mean temperature on the chart scale, i.e. 40° F. on the illustrated chart. In this regard, the rock shaft 27 is purposely located in the same horizontal plane as the center abscissa on the chart scale. Accordingly, the instrument linkage is first adjusted so that at the mean temperature the link 23, 30 and the crank 28 are vertical and the link 29 and stylus arm 22 are horizontal. For this preliminary setting the screws 25—26, set screw 32, and nuts 33—34 may all have to be utilized. Then the instrument is placed in a warmer or colder atmosphere corresponding to one of the temperature extremes on the chart to make a range check. If the stylus 21 does not responsively move to the proper temperature the length of the link 23, 30 is changed by adjusting the nuts 33—34 to adjust the stylus range. For example, if the actual temperature is 90° F. and the stylus only reads 70° F., the link 23, 30 should be lengthened by backing off on nut 33 and tightening nut 34 until the stylus reaches the 90° F. abscissa. Then, when the instrument is placed back at the midscale temperature, if the stylus does not return exactly to midscale it may be necessary to turn the link 23, 30 very slightly by loosening the screws 25—26 and turning the adjusting plate 24 until the stylus reaches midscale. To illustrate, if the stylus only returned to 42° F. the adjusting plate 24 would be turned very slightly counterclockwise when viewed from the front. This stylus centering adjustment may in turn slightly effect the prior stylus range adjustment. If so, a repetition of these adjustments will normally perfectly correlate the thermostatic coil 23, the stylus, and the chart scale.

The cover 18 and case 17, interfit as by bayonet joints comprising interfitting studs 38 on the case and outwardly dished sockets 39 in the cover, and they have complementing straps 40—41 welded thereto and dished outwardly at the middle to provide a pair of alined sockets. These sockets are adapted to fit over the upstanding arms 42a—42b of a mounting bracket 42. The upper of these arms projects above the cover 18 and presents an eye for receiving a looped seal strip 43. With this arrangement the thermometer is easily mounted and yet can not be tampered with without breaking the seal.

It is thought that the advantages of the invention will have been clearly understood from the foregoing detailed description of the illustrated embodiments. Minor changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A recording thermometer comprising, a table, clockwork means for advancing a recording chart lengthwise over said table at a predetermined rate, a stylus working on said table on an arc transverse of the chart for marking the chart as the chart advances, said chart having time indicated along its length and temperature indicated across its width, thermostatic coil means anchored at its inner end relative to said table, a rocker shaft having its turn axis parallel to the center axis of said coil means and fixed at the same level relative to said table as the center of the temperature range of the thermometer, a stylus arm on said shaft and carrying said stylus, a crank on said shaft, and a link pivotally connected to said crank and to the other end of said coil means, said crank and the radius of said coil means which passes through the pivotal connection between the coil means and said link both being substantially at right angles to both the link and the stylus arm when the temperature environment of the thermometer is mid-range and the stylus is responsively at the mid-range position on the chart, and the radial distance from the center of said coil means to its pivotal connection with the link being greater than the effective length of said crank whereby angular travel at the outer end of said coil means responsive to temperature change is multiplied at said stylus.

2. The structure of claim 1 in which adjusting means are provided for varying the ratio of said radial distance of the coil means to the effective length of said crank for correlating the stylus to the temperature range of the chart.

3. The structure of claim 2 in which adjusting means are also provided for turning said coil means bodily about its center axis relative to said table.

4. The structure of claim 1 in which said thermostatic coil means comprises a thermostatic coil which is fixed at its inner end to an adjusting plate and has at its outer end an adjusting pin which extends radially of the coil and is pivotally connected to said link.

5. The structure of claim 1 in which said thermostatic coil means comprises a thermostatic coil which has a terminal outer end portion which is tangential with respect to the center of the coil and has a slot therethrough, a radial adjusting pin extending through said slot and pivotally connected to said link, and lock means on said pin for locking the pin relative to said coil in selected positions varying the radial distance from the center of the coil to the pivotal connection of the adjusting pin with said link.

6. The structure of claim 1 in which said thermostatic coil means comprises a thermostatic coil which has a terminal outer end portion which is tangential with respect to the center of the coil and has a slot therethrough with a flat side, a radial adjusting pin having a flat longitudinal face mating with said flat side for preventing turning of the adjusting pin relative to the coil and for permitting endwise movement of the adjusting pin relative to the coil, a pair of lock nuts threaded onto said adjusting pin and bearing against the opposite sides of said terminal portion of the coil, and a pivotal connection between said adjusting pin and said link.

7. The structure of claim 1 in which said thermostatic coil means includes a thermostatic coil which is fixed at its inner end to an adjusting plate which has an anchor pivot therethrough at the center of the coil and has an arcuate adjusting slot with said anchor pivot as its center, and an adjusting screw passing through said slot for locking said plate in selected position relative to said table.

8. The structure of claim 7 in which said coil has a radially projecting adjusting pin at its outer end which is pivotally connected at its outer end to said link and has means for varying the radial distance from the center of the coil to said pivotal connection of the adjusting pin with the link.

References Cited in the file of this patent

UNITED STATES PATENTS

| | | |
|---|---|---|
| 1,157,255 | Quinn | Oct. 19, 1915 |
| 1,264,478 | Barstow | Apr. 30, 1918 |